(12) United States Patent
Li et al.

(10) Patent No.: US 8,234,413 B2
(45) Date of Patent: *Jul. 31, 2012

(54) PARTITIONING A DATA STREAM USING EMBEDDED ANCHORS

(75) Inventors: Kai Li, Princeton, NJ (US); Umesh Maheshwari, San Jose, CA (US); R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,110

(22) Filed: Jun. 2, 2011

(65) Prior Publication Data

US 2011/0302326 A1  Dec. 8, 2011

Related U.S. Application Data

(63) Continuation of application No. 11/486,957, filed on Jul. 14, 2006, now Pat. No. 7,979,584.

(51) Int. Cl.
*G06F 15/16* (2006.01)
(52) U.S. Cl. ...................................................... 709/247
(58) Field of Classification Search .................. 709/247
See application file for complete search history.

(56) References Cited

U.S. PATENT DOCUMENTS

| | | | |
|---|---|---|---|
| 7,504,969 B2 * | 3/2009 | Patterson et al. | 341/51 |
| 7,979,584 B1 * | 7/2011 | Li et al. | 709/247 |
| 2007/0198523 A1 * | 8/2007 | Hayim | 707/10 |
| 2007/0255758 A1 * | 11/2007 | Zheng et al. | 707/200 |

* cited by examiner

*Primary Examiner* — Larry Donaghue
(74) *Attorney, Agent, or Firm* — Van Pelt, Yi & James LLP

(57) ABSTRACT

Selecting a segment boundary within block b is disclosed. A first anchor location j|j+1 is identified wherein a value of f(b[j−A+1 . . . j+B]) satisfies a constraint and wherein A and B are non-negative integers. A segment boundary location k|k+1 is determined wherein k is greater than minimum distance from j.

18 Claims, 7 Drawing Sheets

PARTITIONING A DATA STREAM USING EMBEDDED ANCHORS

CROSS REFERENCE TO OTHER APPLICATIONS

This application is a continuation of U.S. patent application Ser. No. 11/486,957, entitled PARTITIONING A DATA STREAM USING EMBEDDED ANCHORS filed Jul. 14, 2006 which is incorporated herein by reference for all purposes.

BACKGROUND OF THE INVENTION

Information stored on computer systems often contains substantial redundancies. Storage, communication, and comparison of information can be made more efficient if the information can be segmented intelligently. For example, if a segment has been previously stored or transmitted, then a subsequent request to store or transmit the segment can be replaced with the storage or transmission of an indicator identifying the previously stored or transmitted segment. The indicator can then be used to reconstruct the original segment by referring to the previously stored or transmitted version.

Selecting the boundary of the segment intelligently improves efficiency. For example, if a sequence of bytes appears identically in a number of different locations in the data set or stream (e.g., 'XYZABCDERNNABCDE' contains two occurrences of 'ABCDE') and that sequence of bytes ('ABCDE') is defined to be one of the segments, then the system could avoid storing the second occurrence of the segment and instead store a reference to the first copy. Note if a segment boundary is defined differently each time, then the system may or may not be able to recognize the identical run of bytes in two different segments—for example, a segment of 'ABCDEX' and a segment of 'XABCDE' may or may not be recognized in the system as having the same sequence of information of 'ABCDE.' If a segment boundary divides 'XXXABCDEXXXX' into 'XXXABC' and 'DEXXXX' then 'ABCDE' would not be found as a previously stored sequence. It is important to partition the segments so that the runs of identical bytes are grouped together in the same segment in order to achieve a better storage or transmission efficiency.

In some cases, blocks have been partitioned by setting a series of boundaries that are located within areas of the block that are determined to be similar, or identical, to each other. Similarity, or identity, of these areas within the block can be determined by comparing the areas within the block and seeing if they satisfy a predetermined criteria—for example, if the hash of data values between positions k−A+1 and k+B in block b, where A and B are natural numbers, satisfies a predetermined constraint (e.g., the bottom 12 bits of the hash are all 0's). A boundary is then set within the area of the block that is determined to be similar, or identical—for example, somewhere between k−A+1 and k+B within the block.

However, typically other data values surrounding the similar, if not identical, areas of data are also often similar or identical. Therefore, placing the boundary in the middle of this area of data breaks the data inefficiently because the similar or identical data values in the block are not part of the same segment.

Also, it is important to be able to establish minimum and maximum limits for segments. Simply locating anchors and setting boundaries can produce segments that are not limited to lengths within minimum and maximum limits for segments and thus requiring a separate evaluation and decision processes in order to satisfy the minimum and maximum segment length constraints.

It would be beneficial to increase the amount of similar or identical data value areas in segments to help with the efficiency of storage, communication, or comparison. It would also be beneficial to not have separate evaluation and decision processes in order to satisfy minimum and maximum segment length constraints.

BRIEF DESCRIPTION OF THE DRAWINGS

Various embodiments of the invention are disclosed in the following detailed description and the accompanying drawings.

DETAILED DESCRIPTION

Figure 1:
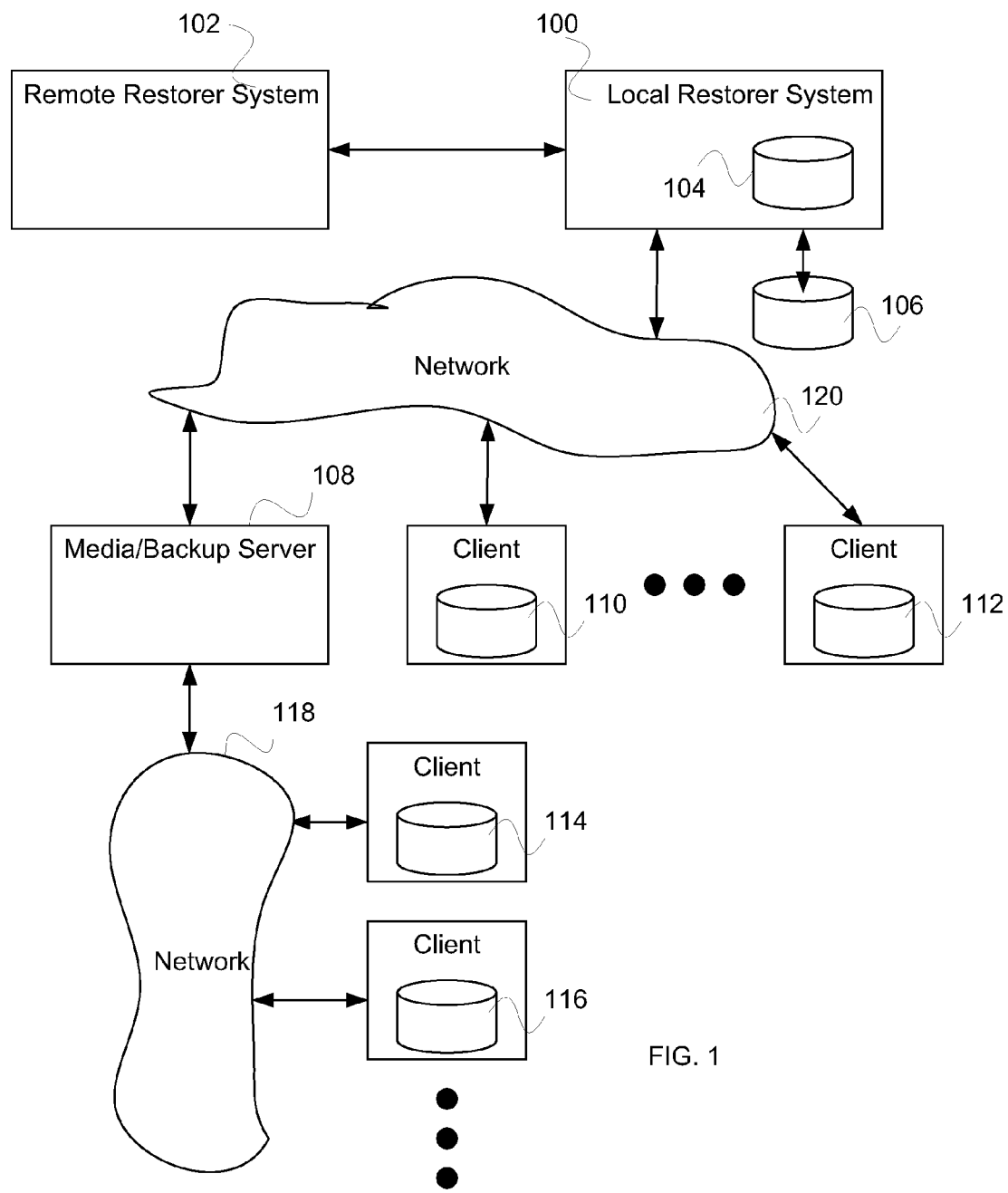
FIG. 1 is a block diagram illustrating an embodiment of a system for efficient storage using resemblance of data segments.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embedded segment boundary selection is disclosed. Within a block b, or input data stream b, a first anchor location j|j+1 is identified. A value of f(b[j−A+1 ... j+B]) satisfies a constraint where A and B are non-negative integers. The function f uses as inputs some or all of the data values from locations j−A+1 to j+B within data block b or input data stream b. A segment boundary location k|k+1 is determined outside of the window determined by A and B. In various embodiments, f comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a sketch, a CRC (Cyclic Redundancy Check) or any other appropriate function to enable the determination of an anchor location. In some embodiments, the constraint satisfied by function f comprises equaling a predetermined value.

In various embodiments, the segment boundary k|k+1 is determined so that a minimum embedded distance criterion is satisfied achieved between a segment boundary location and an anchor location, a maximum embedded distance criterion is satisfied achieved between a segment boundary location and an anchor location, and/or a minimum and a maximum embedded distance criteria are satisfied achieved between a segment boundary location and an anchor location.

In some embodiments, the segment boundary location k|k+1 is determined such that a segment is defined. A plurality of segments is defined by locating a plurality of segment boundary locations. Each segment can be associated with one or more tags. The one or more tags are values associated with a segment that may be used to identify the segment, represent the segment (e.g., in a sequence of segments), locate the segment, compare a segment with another segment (e.g., identify similarity between two segments, identify differences between two segments), be used to reconstruct a segment by using it to retrieve the segment values from a previously stored version of the segment, be used to eliminate duplicate segments, or any other appropriate function in which a tag of a segment can be used. A tag may comprise a function of one or more data values in the segment. In various embodiments, the function comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a sketch (e.g., a statistical measure of the segment—for example, the ten lowest hashes from a sampled set of locations of the segment), a fingerprint, a CRC (Cyclic Redundancy Check) or any other appropriate function to distinguish a segment.

FIG. 1 is a block diagram illustrating an embodiment of a system for efficient storage using resemblance of data segments. In the example shown, local restorer system 100 stores information without loss of information in an input data stream b or input data block b that enables restoration of data originally stored on a client system in the event that the data on the client system is no longer available. Information is stored on an internal storage device 104 or an external storage device 106 of local restorer system 100. In various embodiments, internal storage device 104 comprises one storage device or a plurality of storage devices and/or external storage device 106 comprises one storage device or a plurality of storage devices. Local restorer 100 is in communication with remote restorer 102. Remote restorer 102 stores a copy of information that is stored on local restorer system 100 also enabling restoration of data stored by a client system. In various embodiments, local restorer 100 is in communication with remote restorer 102 using a dedicated communication link, one or more networks, a local area network, a wide area network, a storage area network, the Internet, a wired network, and/or wireless network. In various embodiments, local restorer 100 is not in communication with remote restorer 102 or local restorer 100 is in communication with a plurality of remote restorers.

Local restorer system 100 also communicates with a plurality of client systems represented in FIG. 1 by client system 110 and 112 using network 120. Local restorer system 100 also communicates with media/backup server 108 using network 120. In various embodiments, network 120 comprises one or more networks, a local area network, a wide area network, a storage area network, the Internet, a wired network, and/or wireless network. Media/backup server 108 communicates with a plurality of client systems with storage represented in FIG. 1 by client system with storage 114 and 116 using network 118. In various embodiments, network 118 comprises one or more networks, a local area network, a wide area network, a storage area network, the Internet, a wired network, and/or wireless network. In some embodiments, media/backup server 108 backs up data on client systems with storage which in turn is backed up to local restorer system 100. In various embodiments, local restorer system 100 backs up only one or more clients represented by clients 110 or 112 or only one or more media/backup servers represented by media/backup server 108.

In some embodiments, a similar block diagram is used to implement a general data storage system. A plurality of clients can communicate with a local and a remote data storage system that can efficiently store data/information by storing the information as a plurality of segments or a plurality of segments and differences from segments. The data storage system can reconstruct the stored data by assembling the segments, portions of segments, and/or differences from stored segments into the proper arrangement and provide it to a client, if requested.

Figure 2:
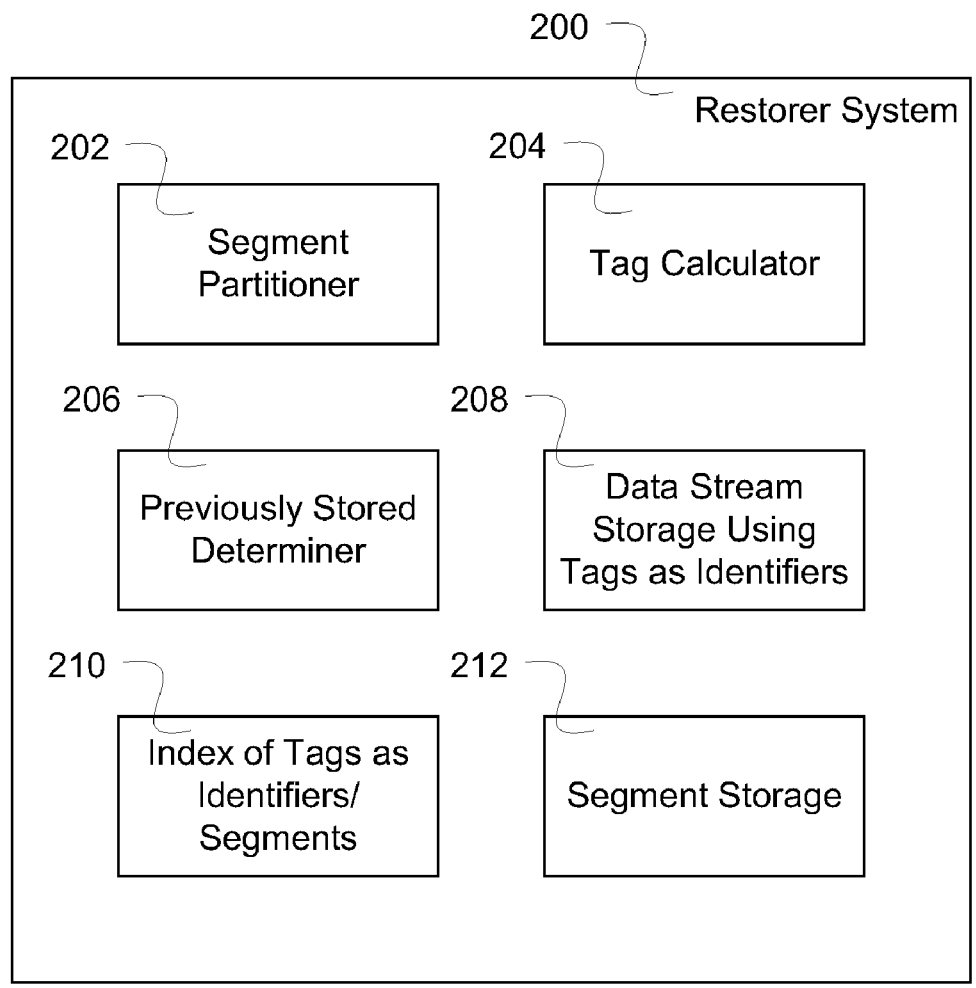
FIG. 2 is a block diagram illustrating an embodiment of a restorer system.

FIG. 2 is a block diagram illustrating an embodiment of a restorer system. In some embodiments, restorer system 200 is used to implement local restorer system 100 and/or remote restorer system 102 of FIG. 1. In the example shown, restorer system 200 includes segment partitioner 202, tag calculator 204, previously stored determiner 206, data stream storage using tags as identifiers 208, index of tags as identifiers/segments 210, and segment storage 212. An input data stream or input data block is partitioned into segments using segment partitioner 202. Segment partitioner 202 partitions segments to enable efficient storage of information in the input data stream. For information that appears multiple times in the input data stream or in the input data block, segment partitioner 202 partitions the input information into segments such that the segments are stored, and if a particular segment, or a very similar segment, appears more than once, the segment can be stored efficiently by referring to the previously stored segment. Segments are partitioned by locating an anchor location and by using the anchor location to determine a segment boundary. In some embodiments, the anchor location is located by satisfying one or more criteria for a function f, where f uses information from an input data stream or an input data block that lies within a defined range of the input data stream or block. In some embodiments, partitioning of segments allows the overlapping of segments.

Tag calculator 204 calculates one or more tags associated with a given segment. A tag can be used to identify a segment uniquely, efficiently determine similarity between segments, locate a segment, or in some cases compare segments. In various embodiments, a tag comprises a function of some or all of the information in the segment, where the function comprises a hash function, SHA-1 (Secure Hash Algorithm 1), MD5 (Message-Digest algorithm 5), SHA-256, SHA-384, SHA-512, RIPEMD-160 (RACE Integrity Primitives Evaluation Message Digest 160-bit version), a sketch, a Rabin hash, a serial number, a physical storage location, or any other appropriate function to distinguish a segment. In various embodiments, a tag is a hash of all of the data values in the segment, some of the data values in the segment, a sampled set of data values in the segment, and/or a masked sampled set of data values in the segment.

Previously stored determiner 206 uses a tag calculated by tag calculator 204 to efficiently determine if the current segment, or a similar segment, has been previously stored. In various embodiments, determining if the current segment, or a similar segment has been previously stored includes searching the tags of previously stored segments to find a match or a close match, matching the current segment with a previously stored segment, finding a similar segment that has been previously stored to the current segment, or any other appropriate method of determining if a segment has been previously stored.

Data stream storage using tags as identifiers 208 stores a representation of an input data stream or block using tags as identifiers in place of the segments that make up the input data stream or block. The representation is compact because the tags as identifiers require less storage space than the actual input data stream.

Index of tags as identifiers/segments 210 associates a segment with a corresponding tag as an identifier. This association between the tags as identifiers and segments enables a data stream or block to be reconstructed by allowing the replacement of a segment data by a corresponding tag as identifier. A segment, once identified, can be retrieved in full by retrieving the segment from segment storage 212. Some tags may or may not be unique for a segment and these tags may or may not be used as identifiers in different contexts. Some tags may include a unique identifier as well as other information used to find similar or identical segments.

In some embodiments, a similar block diagram is used to implement a transmission system. A transmission system includes segment partitioner, tag calculator, previously transmitted determiner, data stream transmitter using tags as identifiers, index of tags as identifiers/segments, and segment transmitter and storage. In some embodiments, the remote side does the determining—for example, a tag as identifier (e.g., a fingerprint) is sent to the remote side, the remote side determines if the segment is there, indicates if the segment needs to be transmitted, and the segment can then be transmitted/received.

Figure 3:
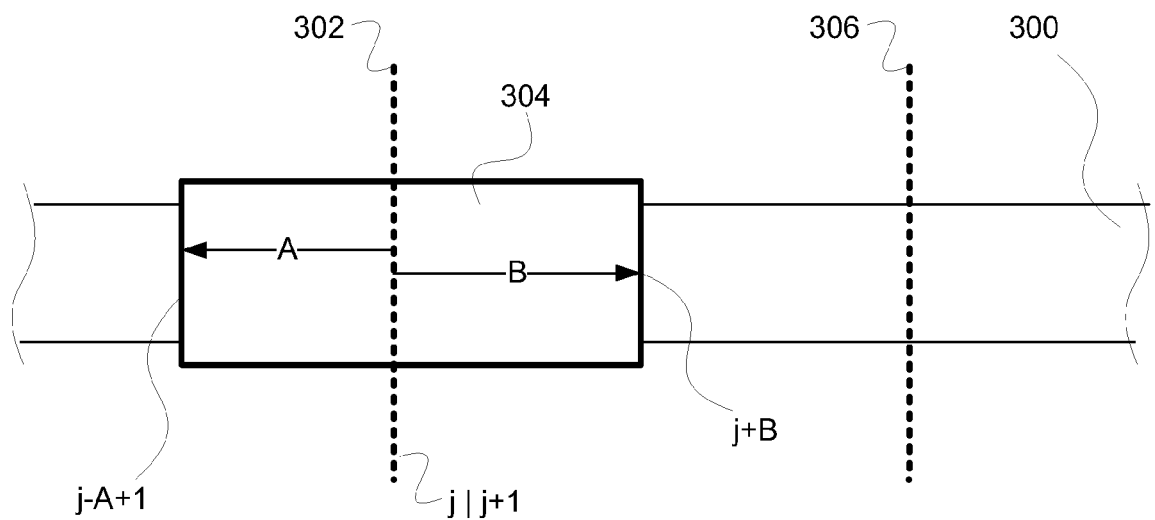
FIG. 3 is a block diagram illustrating an embodiment of a window used for identifying an anchor location.

FIG. 3 is a block diagram illustrating an embodiment of a window used for identifying an anchor location. In some embodiments, the window of FIG. 3 is used in process 202 of FIG. 2. In the example shown, information within data stream or block 300 is indexed with a single index—for example, b[i] where b is data stream or block 300 and i indicates the $i^{th}$ data or information value within the data stream or block b. Anchor 302 is indicated as between j and j+1 by the notation j|j+1 where j and j+1 indicate the index of b between which the anchor is located within data stream or block 300. The j|j+1 anchor is shown in FIG. 3 to be within window 304. The window extent is from j−A+1 to j+B where A and B are non-negative integers. An anchor is identified if one or more criteria are met of a function f where f has as inputs some or all of the data values from within the window of the data stream—for example, f (b[j−A+1 . . . j+B]) satisfies one or more criteria. In various embodiments, f comprises a hash function, SHA-1 (Secure Hash Algorithm 1), MD5 (Message-Digest algorithm 5), RIPEMD-160 (RACE Integrity Primitives Evaluation Message Digest 160-bit version), a Rabin hash, a CRC (Cyclic Redundancy Check), a sum, and XOR or any other appropriate function to identify an anchor location. In some embodiments, the criterion satisfied by function f comprises equaling a predetermined value. Anchor 302 is used to determine a segment boundary location 306. The determination of the boundary location can include the consideration of criteria such as minimum distance from an anchor, maximum distance from an anchor, minimum segment length, maximum segment length, or any other appropriate criteria.

Figure 4A:
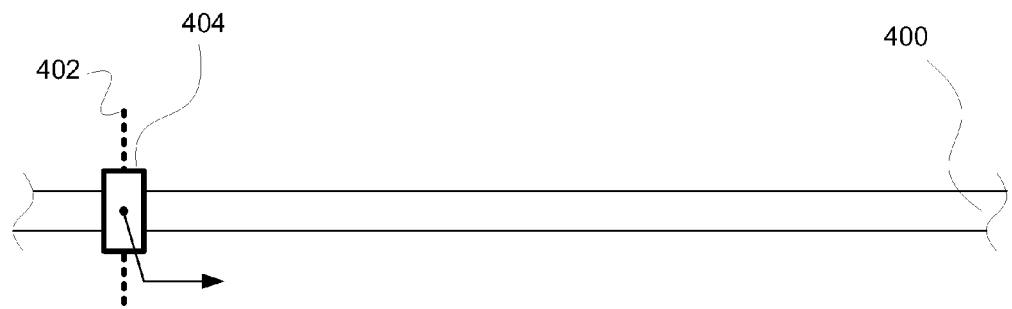
FIG. 4A is a block diagram illustrating an embodiment of a part of the process for determining a boundary of a segment.

FIG. 4A is a block diagram illustrating an embodiment of a part of the process for determining a boundary of a segment. In some embodiments, the part of the process illustrated in FIG. 4A is a part of process 202 of FIG. 2. In the example shown, window 404 is moved—for example, to the right as shown—along data stream or block 400 in search of an anchor location starting at location indicated by 402. In some cases, starting location 402 is defined by a previous anchor location, a previous segment boundary, the start of the data stream or block, or by any other appropriate location in the data stream or block to start search for an anchor location.

Figure 4B:
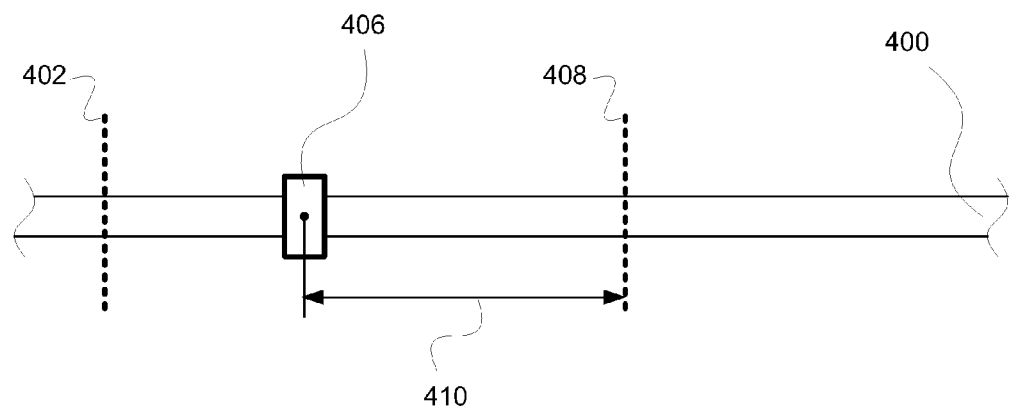
FIG. 4B is a block diagram illustrating an embodiment of a part of the process for determining a boundary of a segment.

FIG. 4B is a block diagram illustrating an embodiment of a part of the process for determining a boundary of a segment. In some embodiments, the part of the process illustrated in FIG. 4B is a part of process 202 of FIG. 2. In the example shown, window 406 is moved along data stream or block 400 in search of an anchor location starting at location indicated by 402. At a location where one or more anchor criteria is/are satisfied, an anchor location is determined. Boundary location 408 is determined based at least in part on the anchor location—for example, a distance indicated by 410 away from the anchor location is designated as boundary location 408. Locating boundary location 408 a distance 410 away from anchor location ensures a minimum embedded distance to the right of an anchor location. The skipping of a distance 410 can reduce the computation resources associated with checking the one or more criteria for locating an anchor location.

Figure 4C:
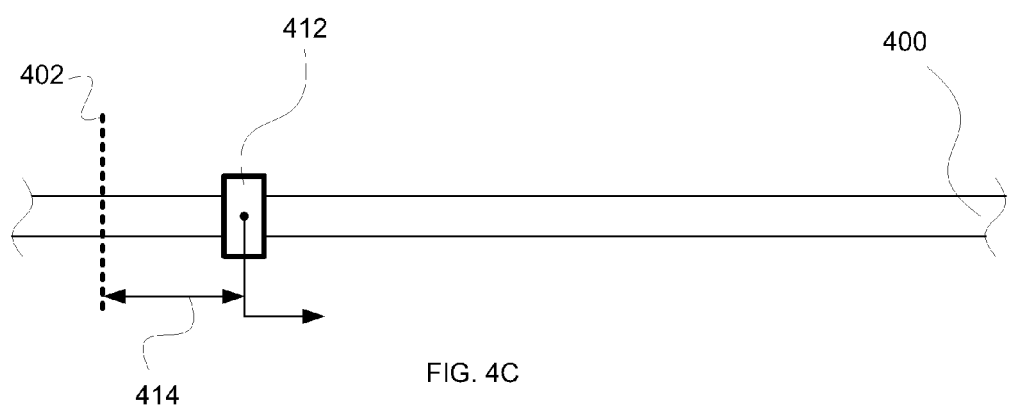
FIG. 4C is a block diagram illustrating an embodiment of a part of the process for determining a boundary of a segment.

FIG. 4C is a block diagram illustrating an embodiment of a part of the process for determining a boundary of a segment. In some embodiments, the part of the process illustrated in FIG. 4C is a part of process 202 of FIG. 2. In the example shown, window 412 is moved—for example, to the right as shown—along data stream or block 400 in search of an anchor location starting at location indicated by 414 away from 402. Starting the search for an anchor 414 away from location 402 ensures a minimum embedded distance to the left of an anchor location. The skipping of a distance 414 can reduce the computation resources associated with checking the one or more criteria for locating an anchor location.

Figure 5A:
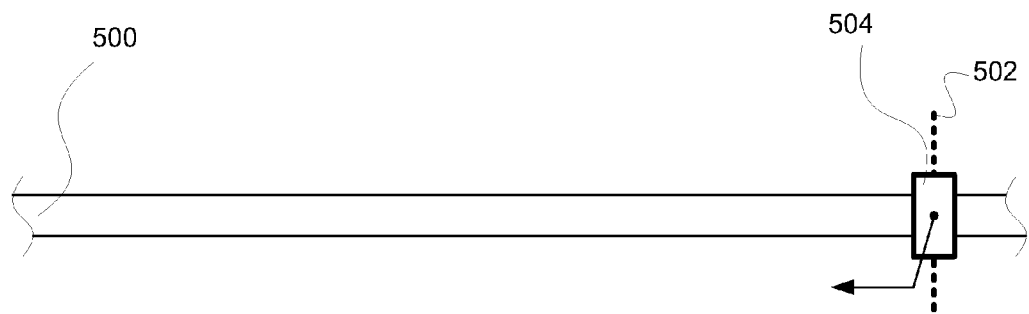
FIG. 5A is a block diagram illustrating an embodiment of a part of the process for determining a boundary of a segment.

FIG. 5A is a block diagram illustrating an embodiment of a part of the process for determining a boundary of a segment. FIG. 5A is similar to FIG. 4A except that the window moves to the left. In some embodiments, the part of the process illustrated in FIG. 5A is a part of process 202 of FIG. 2. In the example shown, window 504 is moved—for example, to the left as shown—along data stream or block 500 in search of an anchor location starting at location indicated by 502. In some cases, starting location 502 is defined by a previous anchor location, a previous segment boundary, the end of the data stream or block, or by any other appropriate location in the data stream or block to start search for an anchor location.

Figure 5B:
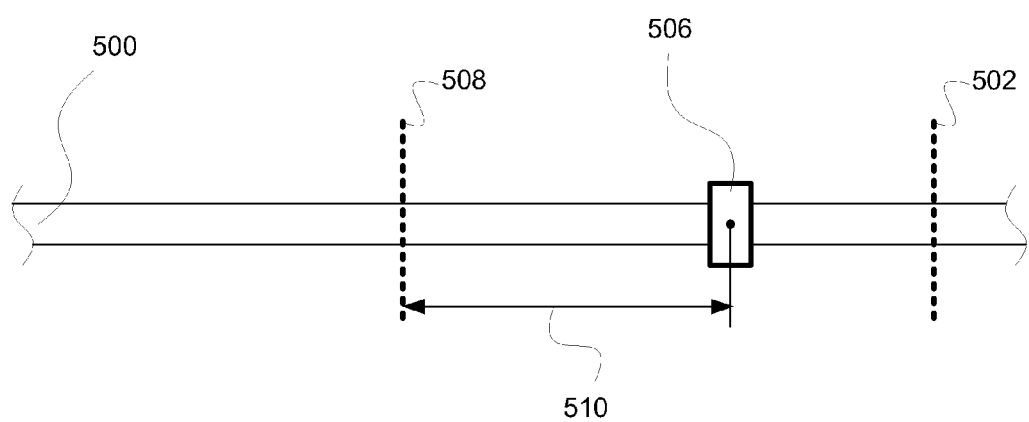
FIG. 5B is a block diagram illustrating an embodiment of a part of the process for determining a boundary of a segment.

FIG. 5B is a block diagram illustrating an embodiment of a part of the process for determining a boundary of a segment. FIG. 5B is similar to FIG. 4B except that the window moves to the left. In some embodiments, the part of the process illustrated in FIG. 5B is a part of process 202 of FIG. 2. In the example shown, window 506 is moved along data stream or block 400 in search of an anchor location starting at location indicated by 502. At a location where one or more anchor criteria is/are satisfied, an anchor location is determined. Boundary location 508 is determined based at least in part on the anchor location—for example, a distance indicated by 510 away from the anchor location is designated as boundary location 508. Locating boundary location 508 a distance 510 away from anchor location ensures a minimum embedded distance to the left of an anchor location. The skipping of a distance 510 can reduce the computation resources associated with checking the one or more criteria for locating an anchor location.

Figure 5C:
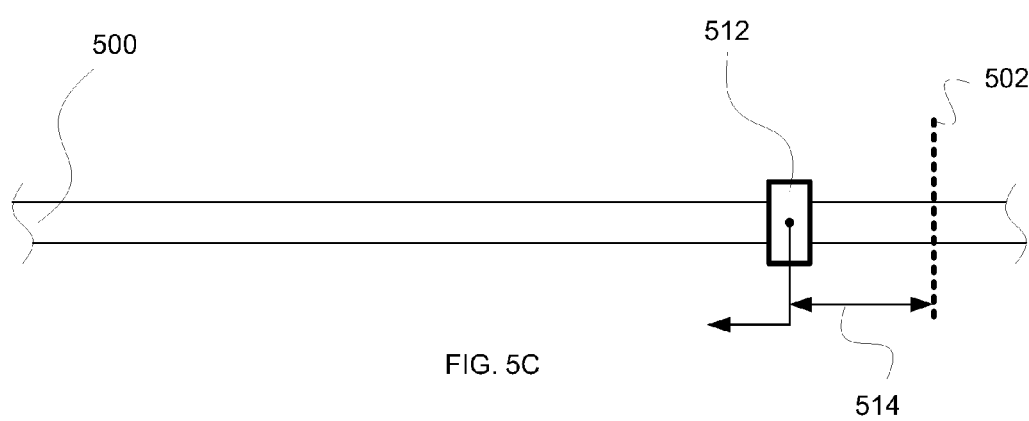
FIG. 5C is a block diagram illustrating an embodiment of a part of the process for determining a boundary of a segment.

FIG. 5C is a block diagram illustrating an embodiment of a part of the process for determining a boundary of a segment. FIG. 5C is similar to FIG. 4C except that the window moves to the left. In some embodiments, the part of the process illustrated in FIG. 5C is a part of process 202 of FIG. 2. In the example shown, window 512 is moved—for example, to the left as shown—along data stream or block 500 in search of an anchor location starting at location indicated by 514 away from 502. Starting the search for an anchor 514 away from location 502 ensures a minimum embedded distance to the right of an anchor location. The skipping of a distance 514 can reduce the computation resources associated with checking the one or more criteria for locating an anchor location.

Figure 6A:
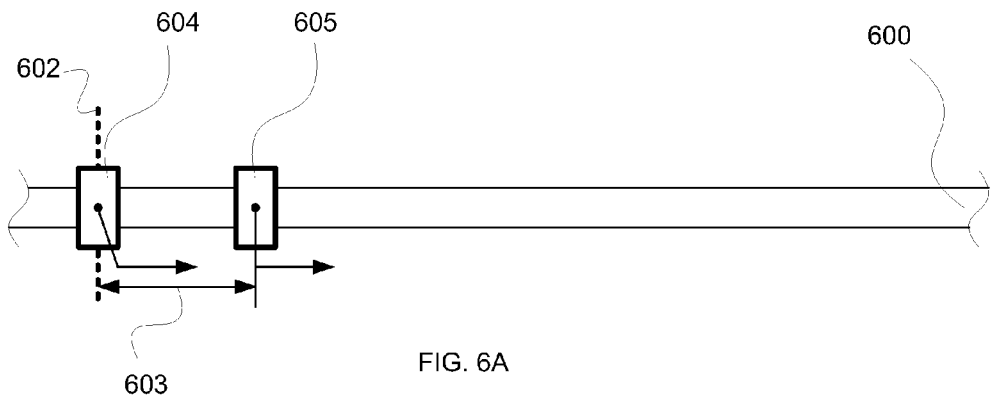
FIG. 6A is a block diagram illustrating an embodiment of a part of the process for determining a boundary of a segment.

FIG. 6A is a block diagram illustrating an embodiment of a part of the process for determining a boundary of a segment. In some embodiments, the part of the process illustrated in FIG. 6A is a part of process 202 of FIG. 2. In the example shown, window 604, or 605 if a distance 603 is skipped from the start location 602, is moved—for example, to the right as shown—along data stream or block 600 in search of an anchor location starting at location indicated by 602. In some cases, starting location 602 is defined by a previous anchor location, a previous segment boundary, the start of the data stream or block, or by any other appropriate location in the data stream or block to start search for an anchor location.

Figure 6B:
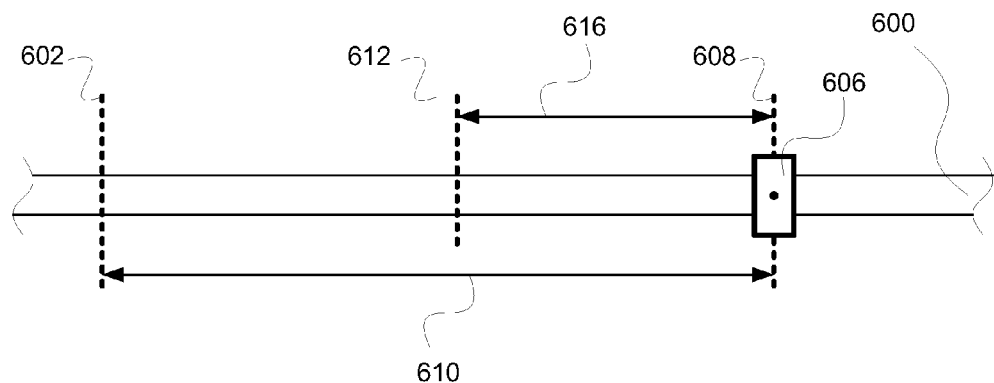
FIG. 6B is a block diagram illustrating an embodiment of a part of the process for determining a boundary of a segment.

FIG. 6B is a block diagram illustrating an embodiment of a part of the process for determining a boundary of a segment. In some embodiments, the part of the process illustrated in FIG. 6B is a part of process 202 of FIG. 2. In the example shown, window 606 is moved along data stream or block 600 in search of an anchor location starting at location indicated by 602. At a location 608 where window 606 has moved across a maximum segment length 610 without one or more anchor criteria being satisfied, boundary location 612 is determined by skipping back a minimum distance 616.

Figure 6C:
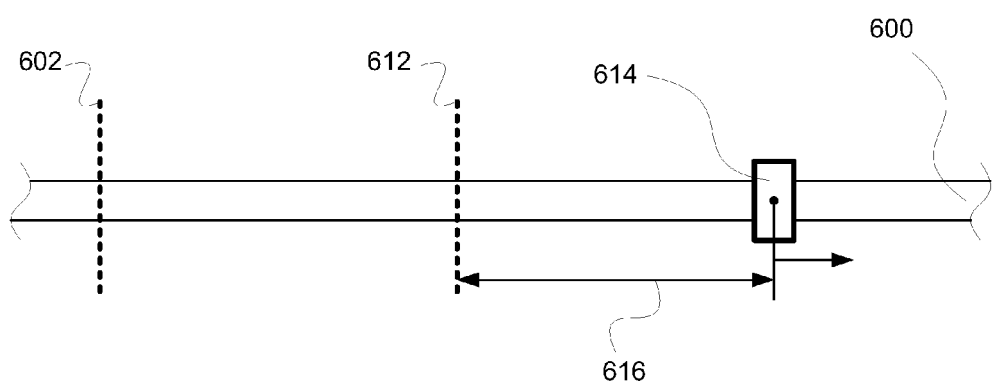
FIG. 6C is a block diagram illustrating an embodiment of a part of the process for determining a boundary of a segment.

FIG. 6C is a block diagram illustrating an embodiment of a part of the process for determining a boundary of a segment. In some embodiments, the part of the process illustrated in FIG. 6C is a part of process 202 of FIG. 2. In the example shown, window 614 starts to move—for example, to the right as shown—along data stream or block 600 in search of an anchor location starting at location indicated by 616 away from 612. Starting the search for an anchor away from location 612 ensures a minimum embedded distance to the left of a next anchor location. The skipping of a distance 616 can reduce the computation resources associated with checking the one or more criteria for locating an anchor location.

In some embodiments, the window moves to the left corresponding to FIGS. 6A, 6B, and 6C.

Figure 7:
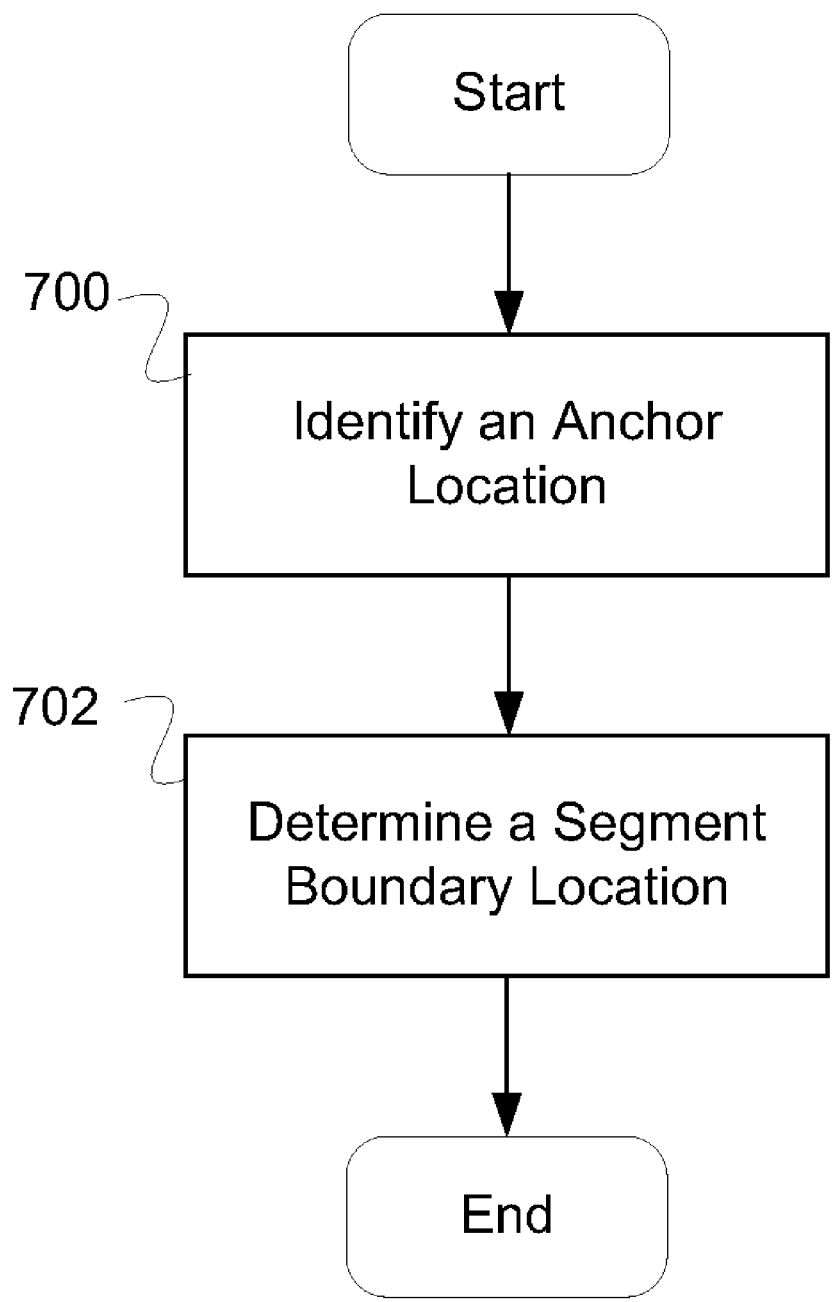
FIG. 7 is a flow diagram illustrating an embodiment of a process for determining a boundary of a segment.

FIG. 7 is a flow diagram illustrating an embodiment of a process for determining a boundary of a segment. In some embodiments, the process of FIG. 7 implements the process illustrated in FIGS. 4, 5, and/or 6. In the example shown, in 700 an anchor location is identified. An anchor location j|j+1 is identified when a value of function f of values in data block or stream b, or f(b[j−A+1 ... j+B]), satisfies a constraint and wherein A and B are non-negative integers. In various embodiments, A and B are negative integers, non-negative integers, and/or integers. Function f comprises a hash function. In various embodiments, the constraint comprises the value of the function being equal to a predetermined value, within a range of two predetermined values, below a predetermined value, above a predetermined value, a hash value logically AND'ed with a mask equal to some value (e.g., the mask could have the 12 lower order bits set and the value when AND'ed must be 0), or any other appropriate constraint. In some embodiments, the function f comprises the mask and AND operation. In 702, a segment boundary location is determined. A segment boundary location k|k+1 is determined by moving at least a minimum distance away from j. In some embodiments, boundary location k|k+1 is determined by moving at most a maximum distance away from j.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for selecting a segment boundary within a block comprising:
a processor configured to:
identify a first anchor location using an index of a block, wherein a value of a function satisfies a constraint, wherein the function operating on a plurality of data values that include a data value associated with the index of the block; and
determine a segment boundary location based at least in part on the first anchor location, wherein the segment boundary location is at least a distance from the first anchor location; and
a memory coupled with the processor, wherein the memory is configured to provide the processor with instructions.

2. The system as in claim 1, wherein the distance is at least a minimum distance.

3. The system as in claim 1, wherein the distance is at most a maximum distance.

4. The system as in claim 1, wherein the function comprises a hash function.

5. The system as in claim 2, wherein the hash function comprises one of the following: SHA-1, MD5, RIPEMD-160, a Rabin hash, a CRC, a sum, or an XOR.

6. The system as in claim 1, wherein the segment boundary location is less than a maximum distance from the first anchor location.

7. The system as in claim 1, wherein the segment boundary location is determined such that a segment is defined that has a length greater than a minimum segment length.

8. The system as in claim 1, wherein the segment boundary location is determined such that a segment defined has a length less than a maximum segment length.

9. The system as in claim 1, wherein the segment boundary location is determined such that a segment is defined.

10. The system as in claim 1, wherein the segment boundary location is determined such that a segment is defined and wherein the segment is associated with a tag.

11. The system as in claim 10, wherein the tag comprises a hash of one or more of the following: all of the data values in the segment, some of the data values in the segment, a sampled set of data values in the segment, and a masked sampled set of data values in the segment.

12. The system as in claim 10, wherein a segment tag is used to represent a segment in a sequence of segments.

13. The system as in claim 10, wherein a segment tag is used to enable reconstruction of data values of a segment in a sequence of segments.

14. The system as in claim 11, wherein a segment tag is used to enable identification of a difference between a first segment and a second segment.

15. The system as in claim 11, wherein a segment tag is used to enable identification of a similarity between a first segment and a second segment.

16. The system as in claim 11, wherein a segment tag is used to enable elimination of duplicate segments.

17. A method of selecting a segment boundary within a block comprising:

identifying a first anchor location using an index of a block, wherein a value of a function satisfies a constraint, wherein the function operating on a plurality of data values that include a data value associated with the index of the block; and determining a segment boundary location based at least in part on the first anchor location, wherein the segment boundary location is a distance from the first anchor location.

18. A computer program product for selecting a segment boundary within a block, the computer program product being embodied in a non-transitory computer readable medium and comprising computer instructions for:

identifying a first anchor location using an index of a block, wherein a value of a function satisfies a constraint, wherein the function operating on a plurality of data values that include a data value associated with the index of the block; and determining a segment boundary location based at least in part on the first anchor location, wherein the segment boundary location is a distance from the first anchor location.

* * * * *